United States Patent
Park et al.

(10) Patent No.: US 12,468,634 B2
(45) Date of Patent: Nov. 11, 2025

(54) SYSTEM AND METHOD FOR PAGE MIRRORING FOR STORAGE

(71) Applicant: Samsung Electronics Co., Ltd., Suwon-si (KR)

(72) Inventors: Heekwon Park, San Jose, CA (US); Jongmin Gim, Pleasanton, CA (US); Jaemin Jung, San Jose, CA (US); Changho Choi, San Jose, CA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/346,698

(22) Filed: Jul. 3, 2023

(65) Prior Publication Data

US 2024/0338317 A1 Oct. 10, 2024

Related U.S. Application Data

(60) Provisional application No. 63/457,357, filed on Apr. 5, 2023.

(51) Int. Cl.
*G06F 12/08* (2016.01)
*G06F 12/0804* (2016.01)
*G06F 12/0882* (2016.01)
*G06F 13/16* (2006.01)

(52) U.S. Cl.
CPC ...... *G06F 12/0882* (2013.01); *G06F 12/0804* (2013.01); *G06F 13/1668* (2013.01)

(58) Field of Classification Search
CPC ............. G06F 12/0882; G06F 12/0804; G06F 13/1668
See application file for complete search history.

(56) References Cited

U.S. PATENT DOCUMENTS

| | | | |
|---|---|---|---|
| 8,799,580 | B2 | 8/2014 | Sakashita et al. |
| 10,235,054 | B1 | 3/2019 | Clark et al. |
| 10,248,576 | B2 | 4/2019 | Jin et al. |
| 10,691,614 | B1* | 6/2020 | Subramani .......... G06F 11/3419 |
| 2009/0182947 | A1 | 7/2009 | van Riel |
| 2020/0050541 | A1 | 2/2020 | Johannes de Jong et al. |
| 2020/0151098 | A1 | 5/2020 | Bruce et al. |
| 2020/0226066 | A1 | 7/2020 | Shifer et al. |
| 2021/0374056 | A1 | 12/2021 | Malladi et al. |
| 2022/0075733 | A1 | 3/2022 | Lea |
| 2023/0014565 | A1* | 1/2023 | Ray ....................... G06F 7/5443 |
| 2023/0019878 | A1 | 1/2023 | Park et al. |
| 2023/0038517 | A1 | 2/2023 | Natu |
| 2023/0066951 | A1* | 3/2023 | Sankaranarayanan ....................... G06F 12/0868 |
| 2023/0099831 | A1 | 3/2023 | Soltaniyeh et al. |

OTHER PUBLICATIONS

EPO Extended European Search Report dated Oct. 1, 2024, issued in corresponding European Patent Application No. 24165414.4 (7 pages).

* cited by examiner

*Primary Examiner* — Masud K Khan
(74) *Attorney, Agent, or Firm* — Lewis Roca Rothgerber Christie LLP

(57) ABSTRACT

A system and method for page mirroring for storage. In some embodiments, the method includes: reading first data from a persistent memory device; establishing that the first data is stored in a first cache; and copying the first data from the first cache to a system memory, wherein the persistent memory device supports an external protocol and a memory protocol.

20 Claims, 7 Drawing Sheets

SYSTEM AND METHOD FOR PAGE MIRRORING FOR STORAGE

CROSS-REFERENCE TO RELATED APPLICATION(S)

The present application claims priority to and the benefit of U.S. Provisional Application No. 63/457,357, filed Apr. 5, 2023, entitled "SYSTEM AND METHOD FOR AUTOMATIC PAGE MIRRORING IN DUAL INTERFACE STORAGE SYSTEMS", the entire content of which is incorporated herein by reference.

FIELD

One or more aspects of embodiments according to the present disclosure relate to computing systems, and more particularly to a system and method for page mirroring for storage.

BACKGROUND

Certain persistent storage devices may support both a storage-based protocol (or "external protocol") (accessed by the host through a driver) and a memory protocol (access by the host through a load or store instruction). Such a device may be connected to a host including a central processing unit, a system memory, and a central processing unit cache.

It is with respect to this general technical environment that aspects of the present disclosure are related.

SUMMARY

According to an embodiment of the present disclosure, there is provided a method, including: reading first data from a persistent memory device; establishing that the first data is stored in a first cache; and copying the first data from the first cache to a system memory, wherein the persistent memory device supports an external protocol and a memory protocol.

In some embodiments, the method further includes determining that a page of the persistent memory device containing the first data is a candidate for promotion to a page cache in the system memory.

In some embodiments, the establishing that the first data is stored in the first cache includes determining that a page of the persistent memory device containing the first data includes accessed data.

In some embodiments, the method further includes: determining from a page table entry corresponding to the first data that a page of the persistent memory device containing the first data includes accessed data; and setting a bit in an entry of an access history table, wherein the establishing that the first data is stored in the first cache includes determining that the bit is set.

In some embodiments, the method further includes: determining from metadata of a page of the persistent memory device containing the first data that the page of the persistent memory device containing the first data includes accessed data; and setting a bit in an entry of an access history table, wherein the establishing that the first data is stored in the first cache includes determining that the bit is set.

In some embodiments, the method further includes: determining, by a first process, that a page of the persistent memory device containing the first data includes accessed data; and setting, by the first process, a bit in an entry of an access history table, wherein the establishing that the first data is stored in the first cache includes determining that the bit is set.

In some embodiments, the method further includes: determining, by a first process, that a page of the persistent memory device containing the first data includes accessed data; and setting, by the first process, a bit in an entry of an access history table, wherein the establishing that the first data is stored in the first cache includes determining, by a second process, that the bit is set.

In some embodiments, the method further includes: determining, by a first process, that a page of the persistent memory device containing the first data includes accessed data; and setting, by the first process, a bit in an entry of an access history table, wherein: the establishing that the first data is stored in the first cache includes determining, by a second process, that the bit is set, and the copying of the first data from the first cache to the system memory includes copying, by the second process, the first data from the first cache to the system memory.

In some embodiments, the method further includes: determining that a page of the persistent memory device containing second data is a candidate for promotion to a page cache in the system memory; and based on a bit in an access history table entry corresponding to the page, copying the second data from the persistent memory device to the system memory.

In some embodiments, the method further includes: determining that a page of the persistent memory device containing second data is a candidate for promotion to a page cache in the system memory; and based on a bit in an access history table entry corresponding to the page, copying the second data from the persistent memory device to the system memory using the external protocol.

According to an embodiment of the present disclosure, there is provided a system, including: a processing circuit; and memory, operatively connected to the processing circuit and storing instructions that, when executed by the processing circuit, cause the system to perform a method, the method including: reading first data from a persistent memory device, the persistent memory device being operatively connected to the processing circuit; establishing that the first data is stored in a first cache; and copying the first data from the first cache to a system memory, wherein the persistent memory device supports an external protocol and a memory protocol.

In some embodiments, the method further includes determining that a page of the persistent memory device containing the first data is a candidate for promotion to a page cache in the system memory.

In some embodiments, the establishing that the first data is stored in the first cache includes determining that a page of the persistent memory device containing the first data includes accessed data.

In some embodiments, the method further includes: determining from a page table entry corresponding to the first data that a page of the persistent memory device containing the first data includes accessed data; and setting a bit in an entry of an access history table, wherein the establishing that the first data is stored in the first cache includes determining that the bit is set.

In some embodiments, the method further includes: determining from metadata of a page of the persistent memory device containing the first data that the page of the persistent memory device containing the first data includes accessed data; and setting a bit in an entry of an access history table, wherein the establishing that the first data is stored in the first cache includes determining that the bit is set.

In some embodiments, the method further includes: determining, by a first process, that a page of the persistent memory device containing the first data includes accessed data; and setting, by the first process, a bit in an entry of an access history table, wherein the establishing that the first data is stored in the first cache includes determining that the bit is set.

In some embodiments, the method further includes: determining, by a first process, that a page of the persistent memory device containing the first data includes accessed data; and setting, by the first process, a bit in an entry of an access history table, wherein the establishing that the first data is stored in the first cache includes determining, by a second process, that the bit is set.

According to an embodiment of the present disclosure, there is provided a device, including: a processing circuit; a first cache, operatively coupled to the processing circuit; and a system memory, operatively coupled to the processing circuit, the device being configured to: read first data from a persistent memory device, the persistent memory device being operatively connected to the processing circuit; establish that the first data is stored in the first cache; and copy the first data from the first cache to the system memory, wherein the persistent memory device supports an external protocol and a memory protocol.

In some embodiments, the device is further configured to determine that a page of the persistent memory device containing the first data is a candidate for promotion to a page cache in the system memory.

In some embodiments, the establishing that the first data is stored in the first cache includes determining that a page of the persistent memory device containing the first data includes accessed data.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
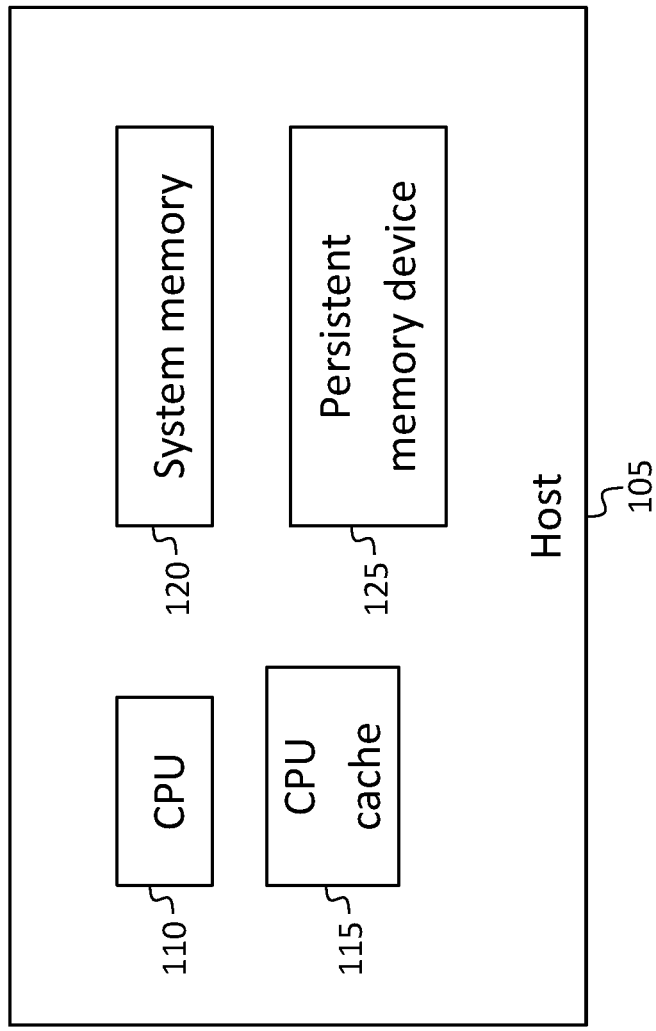
FIG. 1 is a block diagram of a computing system, according to an embodiment of the present disclosure.

The detailed description set forth below in connection with the appended drawings is intended as a description of exemplary embodiments of a system and method for page mirroring for storage provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Certain devices that use a cache-coherent protocol such as Compute Express Link (CXL) may support both a storage-based protocol (or "external protocol") (accessed by the host through a driver) and a memory protocol (access by the host through a load or store instruction). For example, some CXL storage devices may support CXL.io and CXL.mem at the same time. The .mem protocol may have lower read and write latency than the .io protocol. In a CXL device, the .io protocol may submit the request to the device through the operating system (OS) kernel storage stack. The .io protocol may then use direct memory access (DMA) for data transfer and may have better throughput than the .mem protocol. As a result of using direct memory access, the .io protocol may not consume CPU resources. Block input/output (I/O) via .io may transfer data from, for example, a Compute Express Link solid-state drive (CXLSSD) to the dynamic random-access memory (DRAM) page cache. The dynamic random-access memory (DRAM) page cache may have lower latency than accesses using the .mem protocol, once all of the data are loaded into the dynamic random-access memory. Frequently accessed pages may be loaded into the dynamic random-access memory page cache for this reason.

Regardless of where the data is stored, all data may be loaded into the central processing unit (CPU) cache (or "host cache") before user-space processes may access it. This means that even if the system does not load the device memory data into the dynamic random-access memory, the recently accessed data may be in the central processing unit cache. As such, when data is to be stored in the page cache in dynamic random-access memory, it may be possible to copy the data from central processing unit cache to the dynamic random-access memory, instead of copying the data from the persistent memory device into the dynamic random-access memory.

For example, it may be that during a first interval of time, a page of memory is infrequently accessed and is therefore not cached in the dynamic random-access memory page cache of the host. The page may then be accessed by an application, using the .mem protocol, causing the data to be copied into the central processing unit cache. Subsequently, during a second interval of time following the first interval of time, the access frequency of the page may increase, and a frequently accessed page identification process (or "hot page identification" process) may determine that the access frequency has become sufficiently great to justify promoting the page to (for example, copying the page into) the page cache in dynamic random-access memory from the persistent memory device. In this circumstance, the frequently accessed page identification process may register the page with an auto-mirroring daemon, which may then arrange for the page to be copied into the page cache in dynamic random-access memory, either (i) from the central processing unit cache (for example, if the page is present in the central processing unit cache) or (ii) from the persistent memory device.

The contents of the central processing unit cache may be managed by hardware (for example, by a hardware (processor) maintained cache replacement algorithm that may be part of the central processing unit (for example, constructed on the same semiconductor chip as the central processing unit)), the internal state of which (for example, the register contents of which) may not be exposed to software running on the central processing unit; there may not exist a direct method for any instructions executed by the central processing unit to determine whether the page is in the central processing unit cache. As such, in determining whether to copy the page into the page cache in dynamic random-access memory, (i) from the central processing unit cache (for example, if the page is present in the central processing unit cache) or (ii) from the persistent memory device, the auto-mirroring daemon may assess the likelihood that the page is stored in the central processing unit cache (instead of determining with certainty whether the page is stored in the central processing unit cache), as discussed in further detail below.

If the auto-mirroring daemon determines that it is unlikely that the page is stored in the central processing unit cache, it may arrange for the page to be copied from the persistent memory device to the page cache in dynamic random-access memory, using the .io protocol. If the auto-mirroring daemon determines that it is likely that the page is stored in the central processing unit cache, it may attempt to have the page copied from the central processing unit cache directly to the page cache in dynamic random-access memory. It may accomplish this by executing instructions on the central processing unit that copy the page (for example, using load and store instructions) from a first memory address to a second memory address, the first memory address being the address of the page at which the page is accessible in the persistent memory device using the .mem protocol, and the second address being the address in the page cache in dynamic random-access memory at which the page is to be stored. In response to the execution of these instructions, the central processing unit may execute (i) load instructions to read the data of the page from memory at the first address and (ii) store instructions to store the data in memory at the second address. The hardware (processor) maintained cache replacement algorithm may cause the load instruction to fetch data from the central processing unit cache if the data is present in the central processing unit cache, and to fetch the data from the persistent memory device (using the .mem protocol) if the data is not present in the cache. If the data is present in the central processing unit cache, then fetching the data from the central processing unit cache (instead of from the persistent memory device) may make it possible to bypass the operating system's kernel storage stack, and also to eliminate the persistent memory device's round-trip time.

To assess the likelihood that the page is stored in the central processing unit cache, the auto-mirroring daemon may consult, or "check", an access history table, to obtain the recent access history of the page. If the recent access history meets a criterion for high access frequency (for example, a least recently used (LRU) criterion or a most recently used (MRU) criterion), then the auto-mirroring daemon may determine that it is likely that the page is in the central processing unit cache (this may be referred to as "establishing" that the page data is stored in the central processing unit cache (which may be referred to as a "first cache")). Otherwise, the auto-mirroring daemon may determine that it is unlikely that the page is in the central processing unit cache (this may be referred to as "establishing" that the page data is not stored in the central processing unit cache).

The access history table may include a plurality of entries, including one entry for each of a plurality of pages monitored by a process that may be referred to as a device page access checker. Each entry may be a circular bitmap (for example, a circular buffer or a fixed-length queue that is one bit wide). The device page access checker may periodically (for example, every 100 milliseconds (ms) or every 1 second) check whether each page was accessed during the interval of time since the preceding check (each such interval of time between consecutive checks may be referred to as a "period"), and, if it has, it may set the bit corresponding to the current period; otherwise it may clear the bit corresponding to the current period. The setting or clearing of the bit corresponding to the current period may overwrite the value that this bit was set to m periods previously (where m is the length of the circular bitmap), so that each entry of the access history table may contain only relatively recent data regarding accesses to the page.

FIG. 1 is a system-level block diagram of a computing system, in some embodiments. A host 105 includes a central processing unit 110, a central processing unit cache 115, a system memory, which may be dynamic random-access memory 120 (DRAM), and a persistent memory device 125. In operation, the central processing unit 110 of the host 105 may fetch data and instructions (i) from the central processing unit cache 115, (ii) from the dynamic random-access memory 120, or (iii) (using either the .mem protocol or the .io protocol) from the persistent memory device 125. The central processing unit 110 of the host 105 may then process the data according to the instructions, and store the results (i) in the central processing unit cache 115, (ii) in the dynamic random-access memory 120, or (iii) (using either the .mem protocol or the .io protocol) in the persistent memory device 125.

Figure 2:
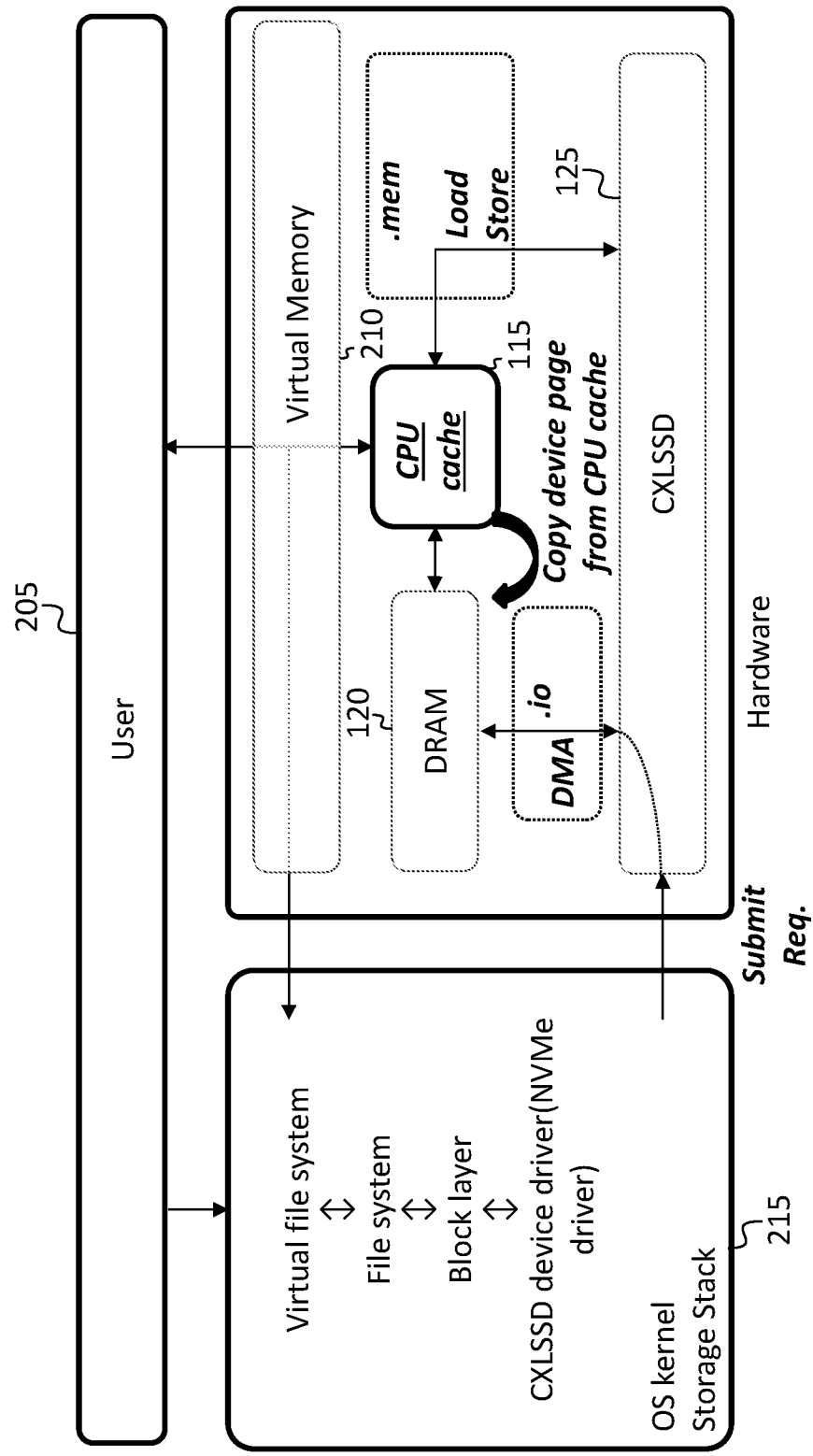
FIG. 2 hybrid block diagram and operating diagram of a computing system, according to an embodiment of the present disclosure.

FIG. 2 is a hybrid block diagram and operating diagram of a computing system. A user (for example, an application 205 running in user space) may access the persistent memory device 125 (which may be a Compute Express Link solid state drive (CXLSSD)) using either the .io protocol or the .mem protocol. In the case of a read access via the .mem protocol, for example, the central processing unit may execute a load command, which may load the requested data, through the virtual memory interface 210, from the central processing unit cache 115 or, if the data is not present in the central processing unit cache 115, from the persistent memory device 125. If the access is via the .io protocol, then the central processing unit 110 may make a call to a suitable driver, which may make calls within the operating system kernel storage stack 215 to access the persistent memory device 125 (for example, via a Nonvolatile Memory Express (NVMe) device driver). The kernel storage stack 215 may include a plurality of layers including a virtual file system layer, a file system layer, a block layer, and a CXL SSD device driver (for example, an NVMe driver) layer. As illustrated in FIG. 2 and as discussed above, in some circumstances it may be possible to copy a device page (for example, a page of data from the persistent memory device 125) directly from the central processing unit cache 115 to the page cache in the dynamic random-access memory 120.

Figure 3:
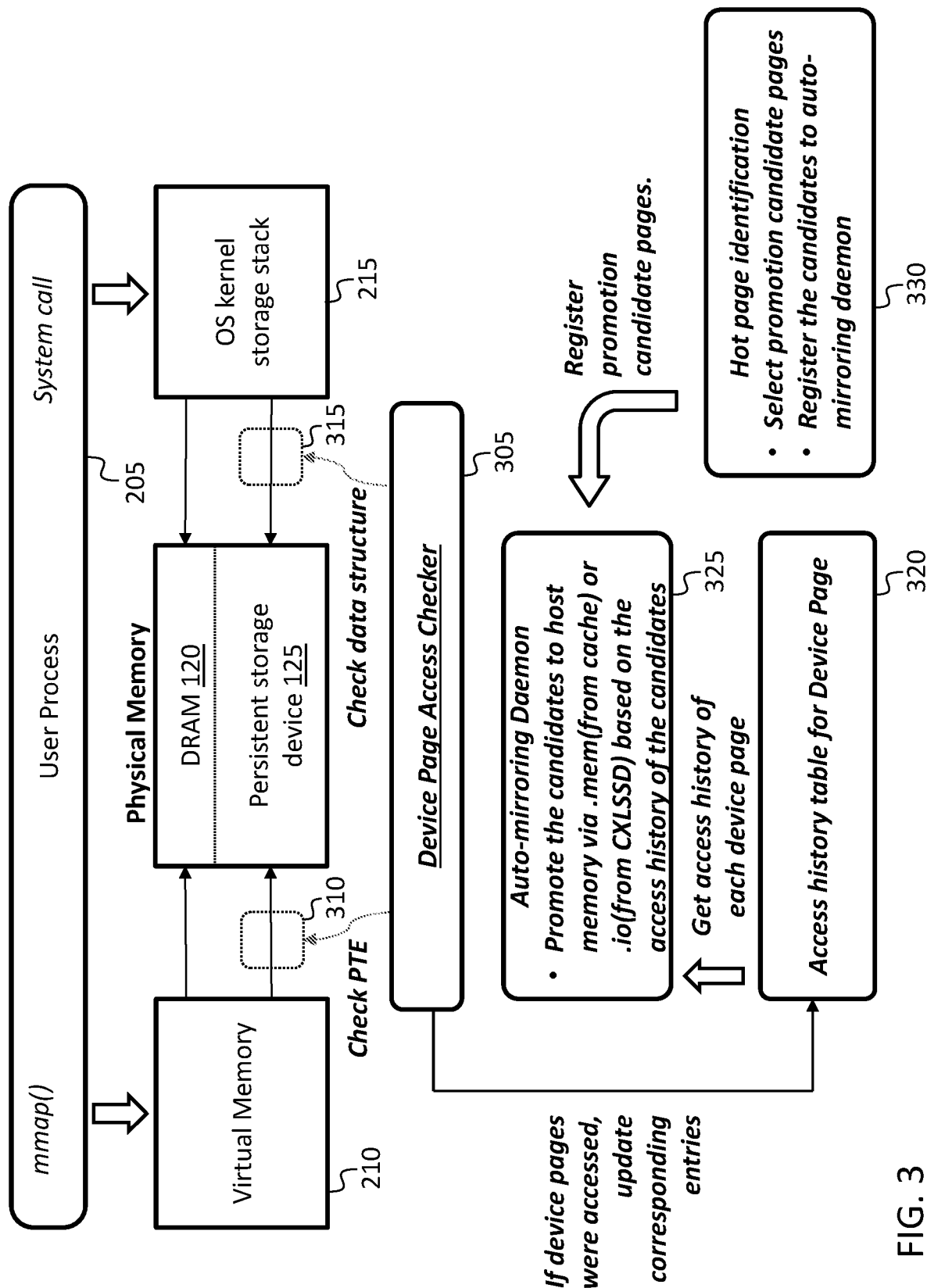
FIG. 3 is a hardware and process diagram for a device page access checker, according to an embodiment of the present disclosure.

Referring to FIG. 3, in some embodiments, a process (for example, a first process) referred to as a device page access checker 305, which may be part of the operating system, may periodically check the page table entry (PTE) 310 and the device page structure 315 (for example, the metadata of the device page) to determine whether the device page has recently been recently accessed. If a device page includes accessed data, the device page access checker 305 updates the corresponding entry in an access history table 320 (discussed in further detail below).

The access history table 320 may include a plurality of entries, one each for a corresponding plurality of device pages. Each entry represents the access history of the device page to which it corresponds. Each entry is a set of bits (for example, m bits), each bit corresponding to a respective time interval (or "period") of a plurality of consecutive recent time intervals (for example, m recent time intervals) for which the access history table is maintained. A bit that is set (or a value of which is set) may indicate that the page was accessed during the interval corresponding to the bit. The device page access checker may run once during every period, and update a current period bit for each device page for which the access history table has an entry.

A second process, which may be referred to as an auto-mirroring daemon 325 may promote recently accessed device pages to the page cache in dynamic random-access memory, for example, to copy pages into the page cache in dynamic random-access memory from either the central processing unit cache 115 or the persistent memory device 125. A frequently accessed page identification process (or "hot page identification" process) 330 may select promotion candidate pages (pages that are candidates for being copied to the page cache in dynamic random-access memory) using cache replacement algorithms such as least recently used (LRU) or most recently used (MRU). The frequently accessed page identification process 330 may register the selected pages to a promotion candidate list managed by the auto-mirroring daemon 325. The auto-mirroring daemon 325 may wake up if the promotion candidate list (or "hot page list") is not empty. If the auto-mirroring daemon 325 cannot promote all the pages in the list in the current period, it may wake up again after a few hundred milliseconds or a few seconds.

The auto-mirroring daemon 325 may then arrange to copy each page identified by the frequently accessed page identification process 330 as a promotion candidate (i.e., each page on the promotion candidate list managed by the auto-mirroring daemon 325) to the page cache in dynamic random-access memory, either using the .io protocol (if the auto-mirroring daemon 325 establishes that the page is not in the central processing unit cache 115), or using the .mem protocol (if the auto-mirroring daemon 325 establishes that the page is in the central processing unit cache 115).

The embodiment of FIG. 3 may have various advantages. A dual-mode Compute Express Link persistent memory device 125 (for example, a persistent memory device 125 that supports both the .mem protocol and the .io protocol) may reduce data transfer overhead from device to host memory by copying data from recently accessed device pages from the central processing unit cache 115. The auto-mirroring daemon 325 may establish whether the data remains in the central processing unit cache 115 by checking whether the data was recently accessed, using the access history table 320. If the auto-mirroring daemon 325 establishes that the data remains in the central processing unit cache 115, the auto-mirroring daemon 325 may then arrange for the data to be copied to the page cache in dynamic random-access memory using the .mem protocol. This may result in the page data being copied directly from the central processing unit cache 115 to the page cache in dynamic random-access memory, if the page data is in the central processing unit cache 115. Even if the page data has been evicted from the central processing unit cache 115, it may still exist in the .mem cache of the persistent memory device 125, and it may be copied to the page cache in dynamic random-access memory from the .mem cache of the persistent memory device 125. If the auto-mirroring daemon 325 establishes that the data does not remain in the central processing unit cache 115, the auto-mirroring daemon 325 may then arrange for the data to be copied to the page cache in dynamic random-access memory using the .io protocol. The .io provides higher throughput than the .mem protocol.

The embodiment of FIG. 3 may also postpone data transfer for pages actively being accessed by an application; this may reduce user interference. The embodiment of FIG. 3 may also resolve cache coherency problems for recently updated device data. Recently updated data may remain in the central processing unit cache 115 as dirty data. In this case, the persistent memory device 125 may have old data, and, if the central processing unit 110 loads the data via the .io protocol, then old data may be loaded into the page cache in dynamic random-access memory. On the other hand, if the auto-mirroring daemon 325 arranges for the page data to be copied from the central processing unit cache 115 using the .mem protocol, this problem may be avoided.

Figure 4A:
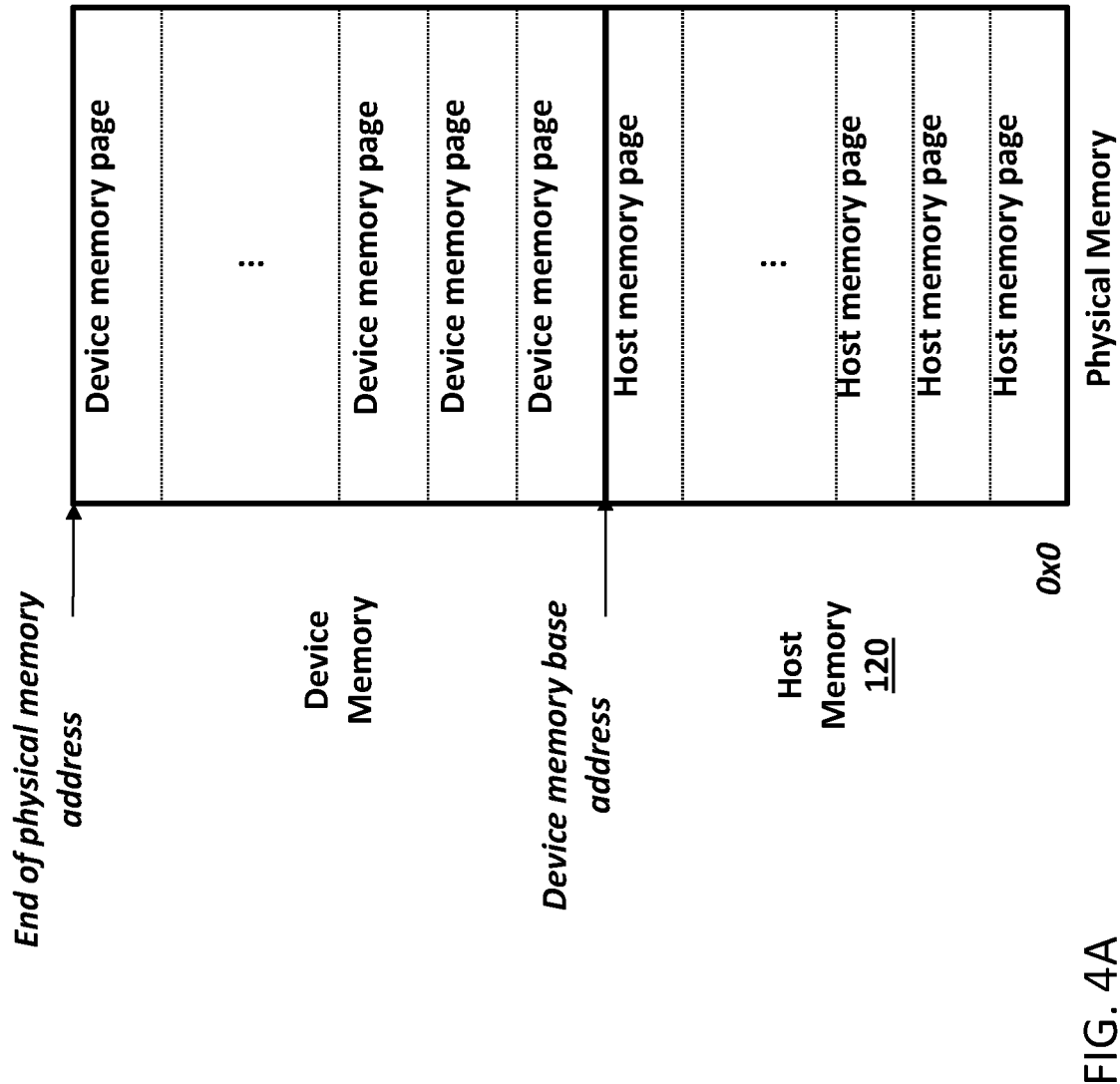
FIG. 4A is a memory layout diagram, according to an embodiment of the present disclosure.
Figure 4B:
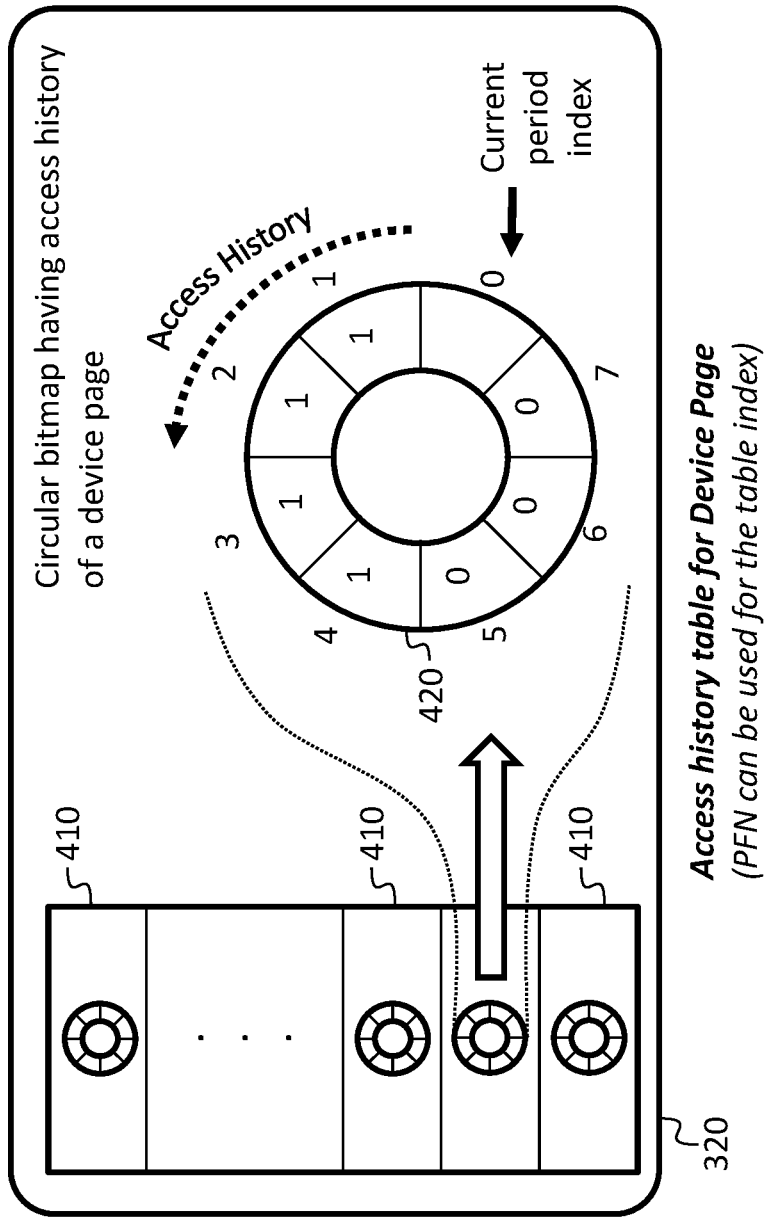
FIG. 4B is a diagram of an access history table, according to an embodiment of the present disclosure.

FIG. 4A shows a memory map of the dynamic random-access memory 120 (or "host memory") of the host 105 and of the memory of the persistent memory device 125. The memory of the persistent memory device 125 may include (for example, consist of) a plurality of pages. Referring to FIG. 4B, the access history table 320 may include a plurality of entries 410, each of the entries 410 of the access history table 320 corresponding to one of the pages of the persistent memory device 125. In the access history table 320, the number of entries equals the number of device pages in the persistent memory device 125. Each entry 410 of the access history table 320 includes a circular bitmap 420 to represent a page's access history.

A current period index indicates the current period bit in the circular bitmap 420. Once during every period, the device page access checker 305 checks the page structure of the persistent memory device 125 and the page table entries, to determine, for each page, whether the page comprises accessed data. If the page includes accessed data, the device page access checker 305 sets the bit corresponding to the current period index, in the entry 410, corresponding to the page, in the access history table 320. If the page has not been accessed, the device page access checker 305 clears the bit corresponding to the current period index, in the entry 410, corresponding to the page, in the access history table 320. As used herein, "setting" a bit (or setting a value of a bit) means setting it to a value (for example, 1 or 0) that indicates that access occurred, and "clearing" the bit means setting it to the other value (of 1 and 0). The current period index is increased after updating, by the device page access checker 305, of all entries 410 corresponding to accessed pages.

Figure 5:
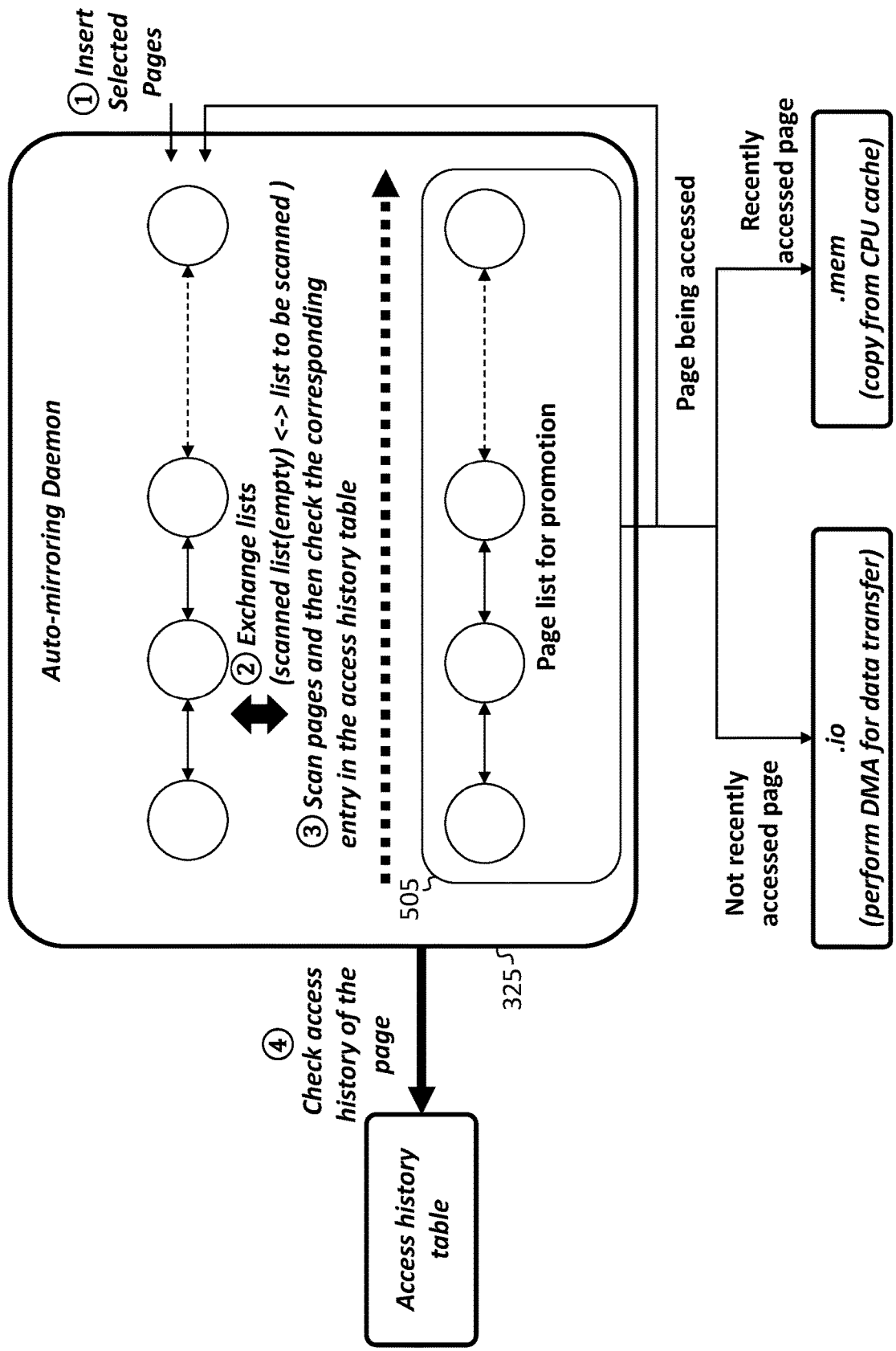
FIG. 5 is a process and data diagram of an auto-mirroring daemon, according to an embodiment of the present disclosure.

FIG. 5 shows the operation of the auto-mirroring daemon 325. After the frequently accessed page identification process 330 registers, at 1, to the auto-mirroring daemon 325, the promotion candidate list 505 (for example, the pages of the persistent memory device 125 that are candidates for promotion to the page cache in dynamic random-access memory). The system may include two linked lists, a list to be scanned (or "active list") and a scanned list, so as not to block inserting. When the auto-mirroring daemon 325 starts scanning, it freezes the active list by exchanging, at 2, the two lists (the list to be scanned and the scanned list). The auto-mirroring daemon 325 then scans, at 3, the frozen list while inserting new pages, and pages that are being accessed, into the newly activated list. This mechanism prevents blocking the insertion of new pages. When the auto-mirroring daemon 325 scans, at 3, the pages in the promotion candidate list 505, it determines, for each page in the promotion candidate list 505, whether to (i) transfer the data from the persistent memory device 125 using the .io protocol, (ii) transfer the data (from the central processing unit cache 115 or from the persistent memory device 125) using the .mem protocol, or (iii) keep the page in the promotion list (without copying the page data to the page cache in dynamic random-access memory). If the auto-mirroring daemon 325 has decided to (i) transfer the data from the persistent memory device 125 using the .io protocol or to (ii) transfer the data (from the central processing unit cache 115 or from the persistent memory device 125) using the .mem protocol, then the auto-mirroring daemon 325 may then, at 4, check the access history table 320 for the access history of the page. If the page was recently accessed, then the auto-mirroring daemon 325 may transfer the data (from the central processing unit cache 115 or from the persistent memory device 125) using the .mem protocol. Otherwise, the auto-mirroring daemon 325 may transfer the data from the persistent memory device 125. using the .io protocol (using direct memory access (DMA).

Figure 6:
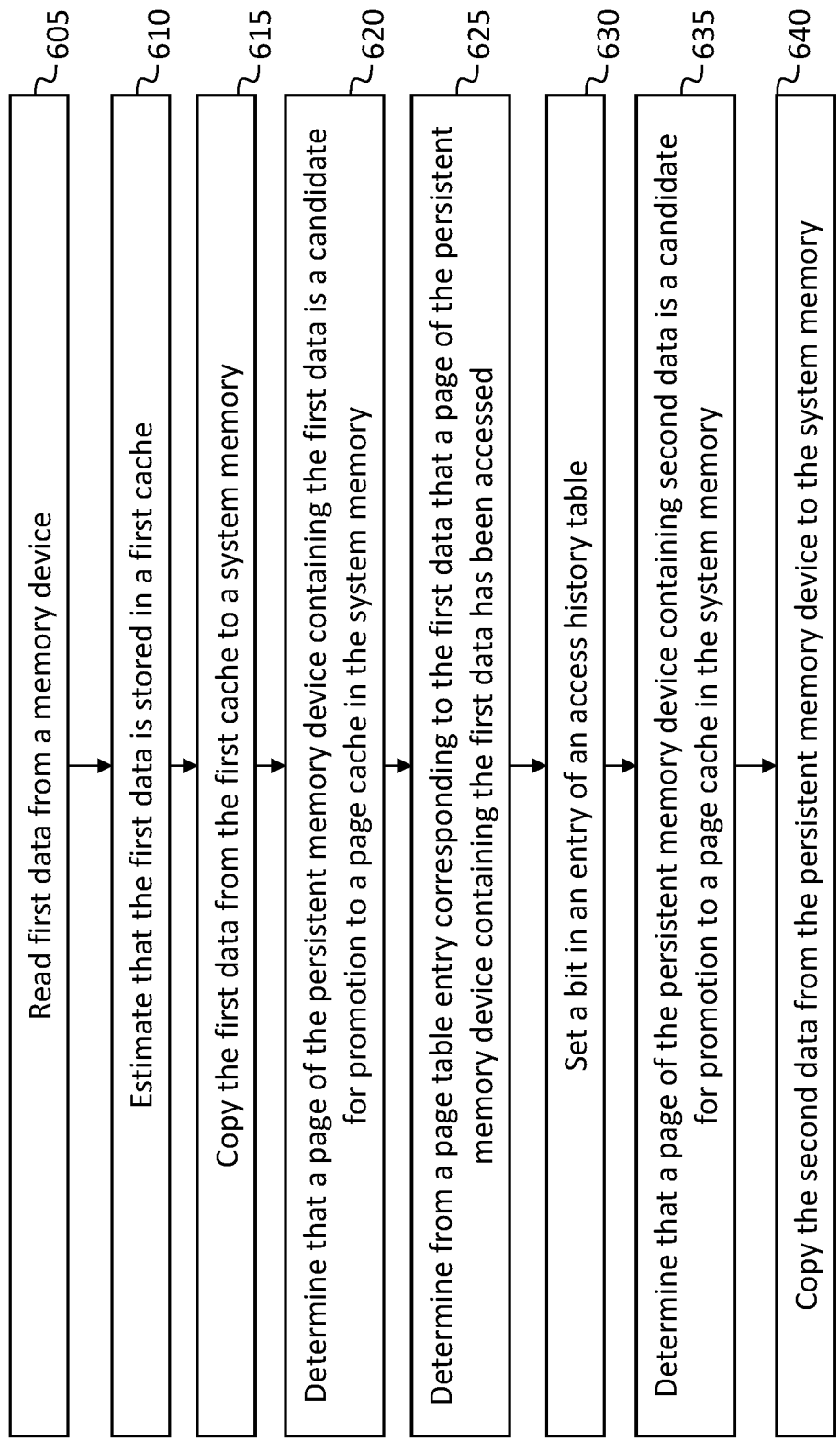
FIG. 6 is a flowchart of a method, according to an embodiment of the present disclosure.

FIG. 6 is a flowchart of a method, in some embodiments. The method includes, reading, at 605, first data from a memory device; establishing, at 610, that the first data is stored in a first cache; and copying, at 615, the first data from the first cache to a system memory. The method further includes determining, at 620 that a page of the persistent memory device containing the first data is a candidate for promotion to a page cache in the system memory. The method further includes determining, at 625, from a page table entry corresponding to the first data that a page of the persistent memory device containing the first data includes accessed data; and setting, at 630 a bit in an entry of an access history table. The method further includes determining, at 635, that a page of the persistent memory device containing second data is a candidate for promotion to a page cache in the system memory; and, based on a bit in an access history table entry corresponding to the page, copying, at 640, the second data from the persistent memory device to the system memory.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (for example, in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (for example, an adjustment) or a first quantity (for example, a first variable) is referred to as being "based on" a second quantity (for example, a second variable) it means that the second quantity is an input to the method or influences the first quantity, for example, the second quantity may be an input (for example, the only input, or one of several inputs) to a function that calculates the first quantity, or the first quantity may be equal to the second quantity, or the first quantity may be the same as (for example, stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A method, comprising:
   reading first data from a persistent memory device;
   establishing that the first data is stored in a first cache; and
   copying the first data from the first cache to a system memory,
   wherein the persistent memory device supports an external protocol and a memory protocol.
2. The method of statement 1, further comprising determining that a page of the persistent memory device containing the first data is a candidate for promotion to a page cache in the system memory.
3. The method of statement 1 or statement 2, wherein the establishing that the first data is stored in a first cache comprises determining that a page of the persistent memory device containing the first data comprises accessed data.
4. The method of any one of the preceding statements, further comprising:
   determining from a page table entry corresponding to the first data that a page of the persistent memory device containing the first data comprises accessed data; and
   setting a bit in an entry of an access history table,
   wherein the establishing that the first data is stored in the first cache comprises determining that the bit is set.
5. The method of any one of the preceding statements, further comprising:
   determining from metadata of a page of the persistent memory device containing the first data that the page of the persistent memory device containing the first data comprises accessed data; and
   setting a bit in an entry of an access history table,
   wherein the establishing that the first data is stored in the first cache comprises determining that the bit is set.
6. The method of any one of the preceding statements, further comprising:
   determining, by a first process, that a page of the persistent memory device containing the first data comprises accessed data; and
   setting, by the first process, a bit in an entry of an access history table,
   wherein the establishing that the first data is stored in the first cache comprises determining that the bit is set.
7. The method of any one of the preceding statements, further comprising:
   determining, by a first process, that a page of the persistent memory device containing the first data comprises accessed data; and
   setting, by the first process, a bit in an entry of an access history table,
   wherein the establishing that the first data is stored in the first cache comprises determining, by a second process, that the bit is set.
8. The method of any one of the preceding statements, further comprising:
   determining, by a first process, that a page of the persistent memory device containing the first data comprises accessed data; and
   setting, by the first process, a bit in an entry of an access history table,
   wherein:
      the establishing that the first data is stored in the first cache comprises determining, by a second process, that the bit is set, and
      the copying of the first data from the first cache to the system memory comprises copying, by the second process, the first data from the first cache to the system memory.
9. The method of any one of the preceding statements, further comprising:
   determining that a page of the persistent memory device containing second data is a candidate for promotion to a page cache in the system memory; and
   based on a bit in an access history table entry corresponding to the page, copying the second data from the persistent memory device to the system memory.
10. The method of any one of the preceding statements, further comprising:
   determining that a page of the persistent memory device containing second data is a candidate for promotion to a page cache in the system memory; and
   based on a bit in an access history table entry corresponding to the page, copying the second data from the persistent memory device to the system memory using the external protocol.
11. A system, comprising:
   a processing circuit; and
   memory, operatively connected to the processing circuit and storing instructions that, when executed by the processing circuit, cause the system to perform a method, the method comprising:
      reading first data from a persistent memory device, the persistent memory device being operatively connected to the processing circuit;
      establishing that the first data is stored in a first cache; and
      copying the first data from the first cache to a system memory,
   wherein the persistent memory device supports an external protocol and a memory protocol.
12. The system of statement 11, wherein the method further comprises determining that a page of the persistent memory device containing the first data is a candidate for promotion to a page cache in the system memory.

13. The system of statement 11 or statement 12, wherein the establishing that the first data is stored in a first cache comprises determining that a page of the persistent memory device containing the first data comprises accessed data.

14. The system of any one of statements 11 to 13, wherein the method further comprises:

determining from a page table entry corresponding to the first data that a page of the persistent memory device containing the first data comprises accessed data; and setting a bit in an entry of an access history table, wherein the establishing that the first data is stored in the first cache comprises determining that the bit is set.

15. The system of any one of statements 11 to 14, wherein the method further comprises:

determining from metadata of a page of the persistent memory device containing the first data that the page of the persistent memory device containing the first data comprises accessed data; and setting a bit in an entry of an access history table, wherein the establishing that the first data is stored in the first cache comprises determining that the bit is set.

16. The system of any one of statements 11 to 15, wherein the method further comprises:

determining, by a first process, that a page of the persistent memory device containing the first data comprises accessed data; and setting, by the first process, a bit in an entry of an access history table, wherein the establishing that the first data is stored in the first cache comprises determining that the bit is set.

17. The system of any one of statements 11 to 16, wherein the method further comprises:

determining, by a first process, that a page of the persistent memory device containing the first data comprises accessed data; and setting, by the first process, a bit in an entry of an access history table, wherein the establishing that the first data is stored in the first cache comprises determining, by a second process, that the bit is set.

18. A device, comprising:

a processing circuit;

a first cache, operatively coupled to the processing circuit; and a system memory, operatively coupled to the processing circuit, the device being configured to:

read first data from a persistent memory device, the persistent memory device being operatively connected to the processing circuit;

establish that the first data is stored in a first cache; and copy the first data from the first cache to a system memory, wherein the persistent memory device supports an external protocol and a memory protocol.

19. The device of statement 18, wherein the device is further configured to determine that a page of the persistent memory device containing the first data is a candidate for promotion to a page cache in the system memory.

20. The device of statement 18 or statement 19, wherein the establishing that the first data is stored in a first cache comprises determining that a page of the persistent memory device containing the first data comprises accessed data.

Although exemplary embodiments of a system and method for page mirroring for storage have been specifically described and illustrated herein, many modifications and variations will be apparent to those skilled in the art. Accordingly, it is to be understood that a system and method for page mirroring for storage constructed according to principles of this disclosure may be embodied other than as specifically described herein. The invention is also defined in the following claims, and equivalents thereof.

What is claimed is:

1. A method, comprising:

reading first data from a persistent memory device;

determining that the first data is stored in a first cache;

determining that the first data is a candidate for promotion to a system memory based on an access frequency of the first data;

copying the first data from the first cache to the system memory; and modifying an entry corresponding to the first data in an access table based on the first data being a candidate for promotion, wherein the persistent memory device supports an external protocol and a memory protocol.

2. The method of claim 1, wherein the first data is a page of the persistent memory device.

3. The method of claim 1, wherein the determining that the first data is stored in the first cache comprises determining that a page of the persistent memory device containing the first data comprises accessed data.

4. The method of claim 1, further comprising:

determining from a page table entry corresponding to the first data that a page of the persistent memory device containing the first data comprises accessed data; and setting a bit corresponding to the modified entry in an access history table, wherein the determining that the first data is stored in the first cache comprises determining that the bit is set.

5. The method of claim 1, further comprising:

determining from metadata of a page of the persistent memory device containing the first data that the page of the persistent memory device containing the first data comprises accessed data; and setting a bit corresponding to the modified entry in an access history table, wherein the determining that the first data is stored in the first cache comprises determining that the bit is set.

6. The method of claim 1, further comprising:

determining, by a first process, that a page of the persistent memory device containing the first data comprises accessed data; and setting, by the first process, a bit corresponding to the modified entry in an access history table, wherein the determining that the first data is stored in the first cache comprises determining that the bit is set.

7. The method of claim 1, further comprising:

determining, by a first process, that a page of the persistent memory device containing the first data comprises accessed data; and setting, by the first process, a bit corresponding to the modified entry in an access history table, wherein the determining that the first data is stored in the first cache comprises determining, by a second process, that the bit is set.

8. The method of claim 1, further comprising:

determining, by a first process, that a page of the persistent memory device containing the first data comprises accessed data; and setting, by the first process, a bit corresponding to the modified entry in an access history table,
wherein:
the determining that the first data is stored in the first cache comprises determining, by a second process, that the bit is set, and
the copying of the first data from the first cache to the system memory comprises copying, by the second process, the first data from the first cache to the system memory.

9. The method of claim 1, further comprising:
determining that a page of the persistent memory device containing second data is a candidate for promotion to a page cache in the system memory; and
based on a bit corresponding to the modified entry in an access history table entry corresponding to the page, copying the second data from the persistent memory device to the system memory.

10. The method of claim 1, further comprising:
determining that a page of the persistent memory device containing second data is a candidate for promotion to a page cache in the system memory; and
based on a bit corresponding to the modified entry in an access history table entry corresponding to the page, copying the second data from the persistent memory device to the system memory using the external protocol.

11. A system, comprising:
a processing circuit; and
memory, operatively connected to the processing circuit and storing instructions that, when executed by the processing circuit, cause the system to perform a method, the method comprising:
reading first data from a persistent memory device, the persistent memory device being operatively connected to the processing circuit;
determining that the first data is stored in a first cache;
determining that the first data is a candidate for promotion to a system memory based on an access frequency of the first data;
copying the first data from the first cache to the system memory; and
modifying an entry corresponding to the first data in an access table based on the first data being a candidate for promotion,
wherein the persistent memory device supports an external protocol and a memory protocol.

12. The system of claim 11, wherein the first data is a page of the persistent memory device.

13. The system of claim 11, wherein the determining that the first data is stored in the first cache comprises determining that a page of the persistent memory device containing the first data comprises accessed data.

14. The system of claim 11, wherein the method further comprises:
determining from a page table entry corresponding to the first data that a page of the persistent memory device containing the first data comprises accessed data; and
setting a bit corresponding to the modified entry in an access history table,
wherein the determining that the first data is stored in the first cache comprises determining that the bit is set.

15. The system of claim 11, wherein the method further comprises:
determining from metadata of a page of the persistent memory device containing the first data that the page of the persistent memory device containing the first data comprises accessed data; and
setting a bit corresponding to the modified entry in an access history table,
wherein the determining that the first data is stored in the first cache comprises determining that the bit is set.

16. The system of claim 11, wherein the method further comprises:
determining, by a first process, that a page of the persistent memory device containing the first data comprises accessed data; and
setting, by the first process, a bit corresponding to the modified entry in an access history table,
wherein the determining that the first data is stored in the first cache comprises determining that the bit is set.

17. The system of claim 11, wherein the method further comprises:
determining, by a first process, that a page of the persistent memory device containing the first data comprises accessed data; and
setting, by the first process, a bit corresponding to the modified entry in an access history table,
wherein the determining that the first data is stored in the first cache comprises determining, by a second process, that the bit is set.

18. A device, comprising:
a processing circuit;
a first cache, operatively coupled to the processing circuit; and
a system memory, operatively coupled to the processing circuit,
the device being configured to:
read first data from a persistent memory device, the persistent memory device being operatively connected to the processing circuit;
determine that the first data is stored in the first cache;
determine that the first data is a candidate for promotion to the system memory based on an access frequency of the first data; and
copy the first data from the first cache to the system memory; and
modify an entry corresponding to the first data in an access table based on the first data being a candidate for promotion,
wherein the persistent memory device supports an external protocol and a memory protocol.

19. The device of claim 18, wherein the first data is a page of the persistent memory device.

20. The device of claim 18, wherein the determining that the first data is stored in the first cache comprises determining that a page of the persistent memory device containing the first data comprises accessed data.

* * * * *